United States Patent
Herdeg et al.

(10) Patent No.: US 6,610,433 B1
(45) Date of Patent: Aug. 26, 2003

(54) FUEL TANK

(75) Inventors: Wolfgang Herdeg, Walddorfhäslach (DE); Holger Klos, München (DE); Martin Sattler, Königsberg (DE); Hans-Dieter Wilhelm, Neu-Anspach (DE); Jürgen Habrich, Hainburg (DE); Karl Eck, Frankfurt (DE); Thomas Zapp, Dortmund (DE); Markus Keutz, Rossdorf (DE)

(73) Assignees: Siemens Aktiengesellschaft, München (DE); P 21 GmbH, Brunnthal (DE)

( * ) Notice: Subject to any disclaimer, the term of this patent is extended or adjusted under 35 U.S.C. 154(b) by 0 days.

(21) Appl. No.: 09/528,666

(22) Filed: Mar. 20, 2000

(30) Foreign Application Priority Data

Mar. 18, 1999 (DE) .......................................... 199 13 977

(51) Int. Cl.⁷ ................................................. H01M 8/02
(52) U.S. Cl. ........................................... 429/17; 429/34
(58) Field of Search ............................. 429/12, 13, 22, 429/34, 17; 137/565, 395, 574, 576; 123/514, 515, 516, 509; 220/565, 567

(56) References Cited

U.S. PATENT DOCUMENTS 5,056,493 A 10/1991 Holzer ....................... 123/518
5,773,162 A * 6/1998 Surampudi et al. .......... 427/115
6,127,057 A * 10/2000 Gorman ....................... 429/13

FOREIGN PATENT DOCUMENTS

DE 37 14 401 11/1988 ........... B65D/15/16

* cited by examiner

Primary Examiner—Patrick Ryan
Assistant Examiner—M. Wills
(74) Attorney, Agent, or Firm—Cohen, Pontani, Lieberman & Pavane

(57) ABSTRACT

A fuel tank, in particular for fuel-cell systems, which can feed fuel into a system via a mechanism without a pump or the like. This is achieved by a fuel tank with a fuel cavity of variable size and a mechanism for compressing the fuel cavity. The fuel cavity is preferably bounded by a cylindrical inner wall of the fuel tank, by a circular end surface of the fuel tank and by a circular, displaceable intermediate wall. The intermediate wall is forced essentially in the direction of the fuel cavity by a spring and has a form fit with the cylindrical inner wall. A feed device and a discharge device allow incorporation in a fuel line. The system also includes a control device and a method for this fuel container, which is thus enabled to have the following operating states: A. fuel-cell system is switched on: discharge valve open, feed valve closed; B. fuel-cell system is in operation: discharge valve open, feed valve open; C. fuel-cell system is switched off: discharge valve closed, feed valve open; and D. fuel-cell system is off, fuel cavity is full: discharge valve closed, feed valve closed.

12 Claims, 2 Drawing Sheets

FUEL TANK

BACKGROUND OF THE INVENTION

1. Field of the Invention

Figure 1:
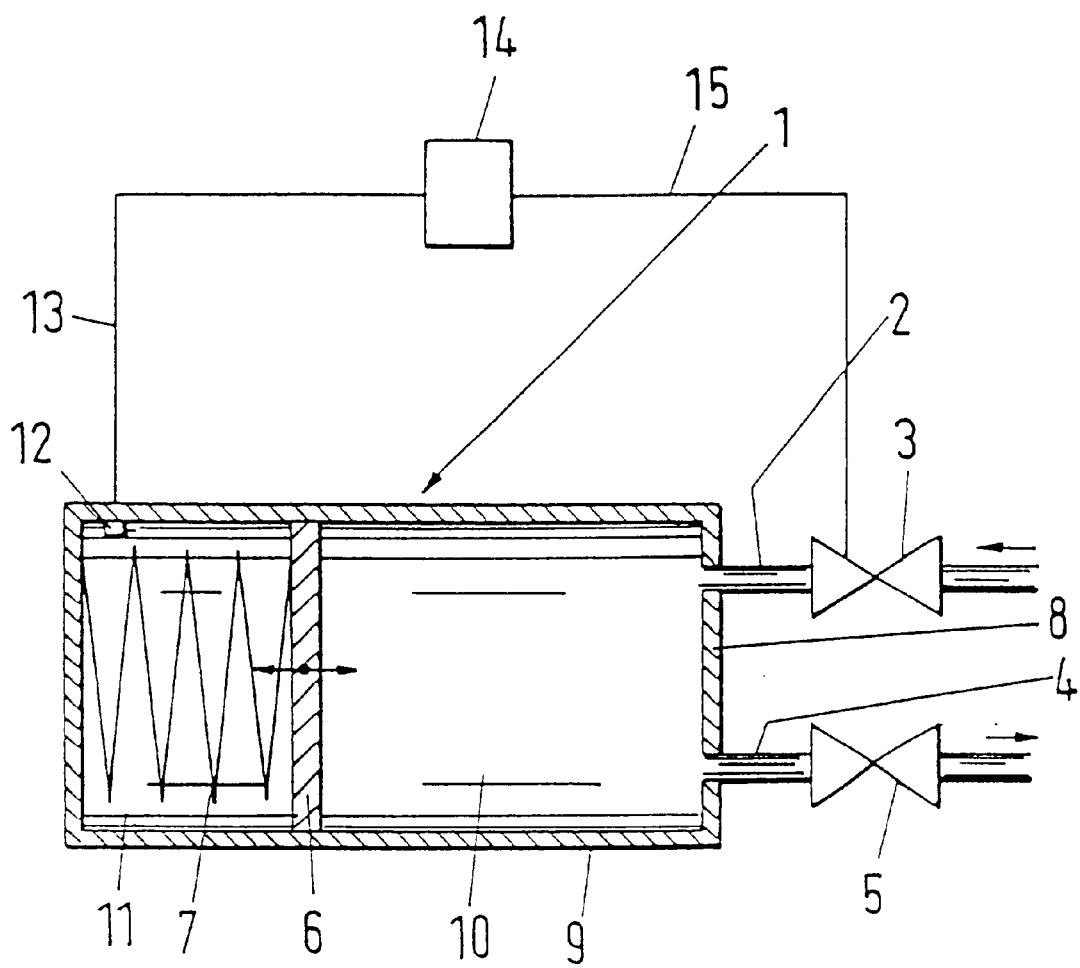

The present invention relates to a fuel tank, a control system and a method of controlling the fuel tank, in particular a fuel tank for a fuel-cell system.

2. Discussion of the Prior Art

Fuel cells in which hydrogen with oxygen is catalytically converted to water, electric energy being released in the process, are becoming increasingly important for a wide range of different applications. Electric energy is available directly without having to be obtained indirectly via a fuel-driven engine and a power generator. In addition, the reaction between hydrogen and oxygen merely releases water, and no pollutants, with the result that the fuel-cell process is particularly well-suited for applications in which no pollutants should be released. Current application areas include space travel, automotive engineering and mobile power supply. Ever-increasing legal requirements for a reduction in the emission of pollutants mean that fuel-cell technology is of increasing interest for automotive application.

At present, in particular, the use of two technologies are considered for providing the necessary hydrogen. One of these is the direct use of molecular hydrogen which is kept under pressure or in a cooled state in specific fuel tanks and is fed to the fuel cell via a feed means. The other technology is the use of hydrocarbons which release the necessary hydrogen in a first stage or during the hydrogen/oxygen catalysis. Examples of such hydrocarbons are methane ($CH_4$) or methanol ($H_3C$—$OH$) since these have the highest proportion of hydrogen per carbon atom. Methanol reacts, under suitable catalytic conditions, with water to release hydrogen:

As can be seen, the yields of hydrogen are particularly high when methanol is used. For this catalytic step, it is necessary to use process water, which has to be fed to the methanol before the catalysis. A proportion by volume of methanol to water of 60 to 40% (resistance to freezing to −40° C.) is sought here. An excess of water does not adversely affect the reforming of methanol to give hydrogen. A lack of water, in contrast, may result in carbon monoxide being produced rather than carbon dioxide, the carbon monoxide, in turn, adversely affecting the actual fuel-cell reaction between hydrogen and oxygen to contaminate the catalyst.

Since water is produced during the reaction of hydrogen with oxygen ($2H_2 \rightarrow O_2 \rightarrow 2H_2O$) in the fuel cell, it is recommended to use this water for mixing with methanol, so that there is no need for any voluminous water tanks. When the process has started, on the other hand, no water is yet available since it first has to be obtained by catalysis. It is thus necessary to keep a certain supply of water by which the process can be started. In the case of mobile applications of fuel cells, for example, their use in motor vehicles, it has to be taken into account that the process water has to be available, and thus must not freeze, even at temperatures as low as −40° C. This is expediently achieved in that the water is mixed immediately after it has been formed, in the fuel cell, with its later reactant methanol, and is then stored on an intermediate basis in an intermediate store. The problem with this, however, has been that this intermediate store, in turn, requires a dedicated pump in order to feed the water/methanol mixture to the process during start-up of the latter. A further pump increases the costs and is a potential source of malfunctioning.

SUMMARY OF THE INVENTION

The object of the present invention is thus to provide a fuel tank which can supply fuel to fuel-consuming systems, at least over a short period of time, without a pump. Furthermore, a control system and a method of controlling a fuel tank as well as a use of the fuel tank are also to be provided.

The invention is also geared to the use of the fuel tank according to the invention in a fuel-cell system.

The invention provides a fuel tank in which the fuel can be forced out of the tank without a pump, with the aid of a mechanism arranged in or on the fuel tank.

Accordingly, the invention is first of all geared to a fuel tank which is connected to a feed line and a discharge line and has a fuel cavity of variable size, and to a means for compressing the fuel cavity in dependence on the internal pressure of the latter.

The fuel cavity is preferably formed in a hollow body which is designed as a cylinder or prism and in which there is arranged an intermediate wall which can be displaced in a sealed manner along the inner wall of the hollow body by means of a spring. In this case, the fuel cavity is bounded, for example, by a cylindrical inner wall of the fuel tank, by a circular end surface of the fuel tank and by a circular, displaceable intermediate wall. The intermediate wall is forced essentially in the direction of the fuel cavity by a spring and has a form fit with the cylindrical inner wall. The fuel can be forced out of the fuel cavity by virtue of the pressure of the spring on the intermediate wall.

In an alternative, particularly preferred embodiment, the fuel cavity is bounded by an inner wall of the fuel tank and by an intermediate wall designed as an elastic membrane. The inherent elasticity of the membrane generates the necessary pressure in order for it to be possible for the fuel to be forced out of the fuel cavity.

Furthermore, the fuel tank has a separate feed means for feeding fuel into the fuel cavity and a separate discharge means for discharging fuel from the fuel cavity. However, it is also possible to provide just one line to the fuel cavity, via which the fuel is both fed and discharged.

It is possible to arrange in the feed means a feed valve, which may also be designed as a non-return valve. Likewise, it is possible to arrange in the discharge means a discharge valve, it being possible for the discharge valve to be, at the same time, a pressure reducer. It is preferable to use, as the discharge valve, an electrically actuated valve which, in the deenergized state, is closed.

In a further aspect, the invention is geared to a control system for the fuel tank, with a feed valve in a feed means and a discharge valve in a discharge means. The fuel tank is arranged in a fuel-cell system. The control system controls the fuel tank, at least in dependence on the following operating states, as follows:

A) Fuel-cell system is switched on: discharge valve is opened, feed valve is kept closed;

B) Fuel-cell system is in operation: discharge valve and feed valve are kept open;

C) Fuel-cell system is switched off: discharge valve is closed and feed valve is kept open; and D) Fuel-cell system is off, fuel cavity is full: discharge valve and feed valve are kept closed.

The invention also comprises a method of controlling the fuel tank, with a feed valve in a feed means and a discharge valve in a discharge means, the fuel tank being arranged in a fuel-cell system, and the fuel tank being controlled, at least in dependence on the following operating states, as follows:

A) Fuel-cell-system is switched on: discharge valve is opened, feed valve is kept closed;

B) Fuel-cell system is in operation: discharge valve and feed valve are kept open;

C) Fuel-cell system is switched off: discharge valve is closed and feed valve is kept open;and D) Fuel-cell system is off, fuel cavity is full: discharge valve and feed valve are kept closed.

Finally, the invention is also geared to the use of the fuel tank according to the invention in a fuel-cell system, in particular in a fuel-cell system for vehicle propulsion, although this use is not to be taken as limiting. Rather, the fuel tank according to the invention may also advantageously be used in other propulsion and energy-generating systems, provided that fuel supply which is not driven by a pump is desirable. In aircraft for general air travel, use is usually made, for example, as an emergency system, of an electric fuel pump which can still supply the engine with fuel even if the main pump is defective. However, this pump is dependent on the functional capacity of the electrical system. Using the fuel tank according to the invention of a suitable size, however, would make it possible to realize a purely mechanically operating backup system which would keep the engine functional at least for a period of a few minutes, for example as an emergency landing is carried out.

For use in a fuel-cell system, the maximum extent of the volume of the variable fuel cavity is advantageously sufficient to ensure the fuel supply for the heating-up phase of the fuel-cell system. A possible size for the fuel cavity is between 0.1 and 10 l, preferably between 0.1 and 5 l, and particularly preferably between 0.2 and 1 l. Larger fuel cavities are also conceivable if there is a corresponding fuel requirement.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE PREFERRED EMBODIMENTS

Figure 2:
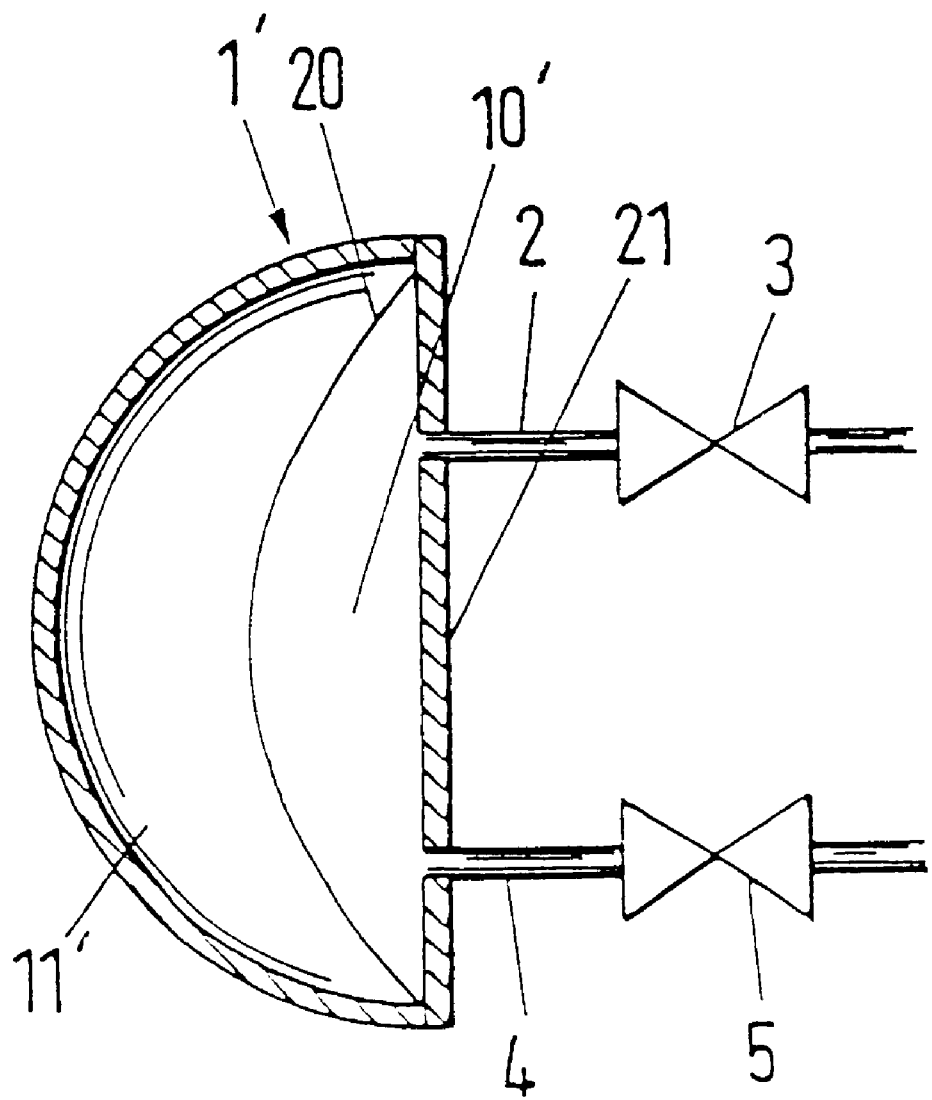

FIG. 1 shows, in cross section, a first embodiment of the present invention, in which a cylindrical fuel tank is used; and FIG. 2 shows, in cross section, a second embodiment of the present invention, in which a hemispherical or semi-lenticular fuel tank is used.

DETAILED DESCRIPTION OF THE PREFERRED EMBODIMENTS

The present invention achieves the object of allowing fuel to be fed without a pump. The basic principle of the invention is to propose a fuel tank in which the fuel is forced mechanically out of the fuel tank by a mechanism arranged in the fuel tank. There are a number of possible ways of generating the pressure to which the fuel has to be subjected for this purpose. It is thus possible, for example, to subject the fuel to the necessary pressure by means of spring force or the stressing of an elastic membrane or else by a compressed gas cushion.

FIG. 1 shows an embodiment of the invention in which a spring generates the pressure. Arranged on the cylindrical fuel tank 1 is a feed means 2 with a non-return valve 3 and a discharge means 4 with a pressure regulator/reducer 5, said feed means and discharge means serving for feeding and removing fuel. The cylindrical inner wall 9 of the fuel tank 1, one of the end sides 8 of the fuel tank 1 and a displaceable intermediate wall 6 form a fuel cavity 10, which serves for accommodating the fuel. The intermediate wall 6 is designed to have a form fit with the cylindrical inner wall 9, in order to ensure that the fuel cavity 10 is sealed in relation to the remaining space 11 in the fuel tank 1. The capacity for form fitting can be achieved or improved by a seal which is fitted on the outer circumference of the intermediate wall 6 and presses against the cylindrical inner wall 9.

In the remaining space 11, a spring 7 is clamped in between the intermediate wall 6 and the other end surface of the fuel tank. This spring 7 subjects the fuel cavity 10 to pressure.

It is also possible to provide on the fuel tank 1 according to the invention a control means 14, which regulates the filling level of the fuel cavity 10. Arranged, for this purpose, in the remaining space 11 is a sensor 12, for example a switch, which emits a signal to the control means 14 via a control line 13 as soon as the intermediate wall 6 comes into contact with it, that is to say when the maximum filling level of the fuel cavity 10 has been reached or is just being reached. The control means 14 then closes the valve 3, via signal line 15, in order to interrupt the flow of fuel.

In an alternative embodiment, a stop (not illustrated) is arranged in the fuel tank 1 for the intermediate wall 6, and this prevents the spring 7 from being compressed beyond a certain extent. When the maximum volume of fuel has been reached, the control means 14 switches off the feed of fuel, for example induced by a pressure sensor.

In another embodiment, it is also possible for the function of the valve 3 to be performed by a pump which pumps the fuel to the fuel tank according to the invention. In this case, the control means 14 switches off the pump, instead of closing the valve 3, in order to interrupt the flow of fuel.

The pressure regulator 5 is preferably designed as an electrically actuated valve which, in the deenergized state, is closed. This makes it possible to achieve the situation where, in the event of a power failure or when the entire system, for example a fuel-cell system, is switched off, the fuel reliably remains in the fuel cavity and cannot run out. The pressure regulator is optionally designed, at the same time, as a pressure reducer. This allows a relatively high pressure in the fuel cavity 10, precisely at the beginning of the emptying operation, to be reduced such that it corresponds to the necessary pressure conditions in the downstream part of the system and remains essentially constant throughout the entire emptying operation.

FIG. 2 shows a second embodiment of the present invention, in which use is made of a hemispherical or semi-lenticular fuel tank 1', in the interior of which there is inserted a membrane 20 which separates a fuel cavity 10' from a remaining space 11'. The membrane 20 is connected in a sealing manner to the fuel tank over its entire circumference, with the result that the end side 21 of the fuel tank 1 and the membrane 20 can form a hermetically sealed fuel cavity 10'. As fuel is introduced into this fuel cavity 10', the membrane 20 bulges to an increasing extent until, finally, by virtue of the counterpressure of the membrane 20 or as the membrane 20 strikes against the hemispherical or semi-lenticular outer wall of the fuel tank, the maximum filling level of the fuel cavity has been reached. A filling-level sensor 12 may be dispensed with here since, in contrast to the case of the spring in the embodiment of FIG. 1, excessive compression should not have any adverse effect. Rather, the membrane will simply fit snugly against the inside of the outer wall provided that there is ventilation on the rear side of the membrane. The pressure to which the filling of fuel is subjected is generated exclusively by the spring force of the membrane. If, however, there is no ventilation at the rear of the membrane, a compressed-air cushion builds up as the filling of fuel increases, and this provides the pressure for the compression of the fuel cavity. There is no need for the membrane itself in this case to apply any pronounced spring forces.

In one cycle, the fuel tank goes through various operating states, and these are explained hereinbelow. In the "initial" state, the fuel cavity 10 is compressed to its minimum, and in the extreme case it is totally absent, when the intermediate wall 6 presses directly against the front side 8 or the membrane 20 rests directly on the side 21. The empty fuel cavity 10 is first of all filled with fuel, for example when a fuel-cell system connected to it is switched off. This takes place by the valve 3 being opened, while the pressure regulator 5 is closed. The pressure of the fuel flowing out of the feed means 2 then expands the fuel cavity 10 until either pressure equilibrium is established between the liquid and, for example, the spring 7 or the membrane 20 or the sensor 12 establishes the maximum filling level of the fuel cavity 10. In the latter case, the valve 3 is closed. Since it is designed, for example, as a non-return valve, a closing operation in such cases is even superfluous. The non-return valve 3 reliably ensures that it is no longer possible for any fuel to run back out of the fuel cavity 10 into the feed means 2.

When the fuel located in the fuel cavity is required, for example when a fuel-cell process is started, the pressure-regulator valve 5 is opened. The pressure to which the fuel is subjected, and is built up in the spring 7, by the membrane 20 or in some other way, propels said fuel out of the fuel cavity 10, through the discharge means 4, to the system which is to be supplied. As the size of the fuel cavity 10 decreases, the pressure to which the fuel is subjected decreases.

If the fuel tank 1 according to the invention is incorporated in the main fuel line, the valve 3 is then opened, with the result that new fuel can flow from the feed means 2 into the fuel cavity 10, but from there flows on immediately into the discharge means 4, with the result that the remaining fuel cavity 10 then functions merely as part of the fuel line. If the valve 3 is designed as a non-return valve, it need not even be opened by separate activation since, as the pressure in the fuel cavity 10 decreases, it automatically opens again under the pressure in the fuel line and/or the feed means 2.

When the system is switched off or when, in general, the fuel tank is to be refilled with fuel, the above-described filling steps are carried out again. When used in fuel-cell systems, this refilling operation takes place as the system is run down, before said system is switched off completely. It is only when the fuel tank 1 has been filled again that the fuel pumps are also switched off in this case. Once the system has been switched off, the pressure regulator 5 preferably remains, on account of its design, closed, as does the non-return valve 3.

The invention is not limited by the embodiments described above which are presented as examples only but can be modified in various ways within the scope of protection defined by the appended patent claims.

We claim:

1. A fuel tank, comprising: fuel discharge means including a discharge line; fuel feed means including a feed line; a fuel cavity connected to the feed line and the discharge line; and means for changing volume of the fuel cavity in dependence on internal pressure of the fuel cavity, the volume changing means generating a necessary pressure for forcing fuel out of the fuel cavity without a pump for supplying fuel-consuming systems.

2. A fuel tank as defined in claim 1, wherein the fuel cavity is one of a cylindrical and a prismatic hollow body having an inner wall, and further comprising an intermediate wall arranged in the hollow body so as to be displacable in a sealed manner along the inner wall of the hollow body, and a spring arranged in the hollow body so as to displace the intermediate wall.

3. A fuel tank as defined in claim 1, and further comprising a body and an elastic membrane arranged in the body so that the fuel cavity is bounded by an inner wall of the fuel tank body and the elastic membrane.

4. A fuel tank as defined in claim 1, wherein the feed means and the discharge means are designed to be physically separate from one another.

5. A fuel tank as defined in claim 1, wherein the feed means includes a feed valve operative to block the feed line.

6. A fuel tank as defined in claim 5, wherein the feed valve is a non-return valve.

7. A fuel tank as defined in claim 1, wherein the discharge means includes a discharge valve operative to block the discharge line.

8. A fuel tank as defined in claim 7, wherein the discharge valve is also a pressure reducer.

9. A fuel tank as defined in claim 7, wherein the discharge valve is configured to be electrically actuable and is closed in a deenergized state.

10. A method of controlling a fuel tank having fuel discharge means including a discharge line, fuel feed means including a feed line, a fuel cavity connected to the feed line and the discharge line, and means for changing volume of the fuel cavity in dependence on internal pressure of the fuel cavity, the volume changing means generating a necessary pressure for forcing fuel out of the fuel cavity without a pump to supply fuel-consuming systems, the fuel tank being arranged in a fuel-cell system, the method comprising the steps of:

A) opening the discharge valve and keeping the feed valve closed when the fuel-cell system is switched on;

B) keeping the discharge valve and the feed valve open when the fuel-cell system is in operation;

C) closing the discharge valve and keeping the feed valve open when the fuel-cell system is switched off; and D) keeping the discharge valve and the feed valve closed when the fuel-cell system is off and the fuel cavity is full.

11. A fuel-cell system, comprising: a fuel tank; fuel discharge means connected to the tank and including a discharge line; fuel feed means connected to the tank and including a feed line; a fuel cavity arranged in the tank and connected to the feed line and the discharge line; and means for changing volume of the fuel cavity in dependence on internal pressure of the fuel cavity, the volume changing means generating a necessary pressure for forcing fuel out of the fuel cavity without a pump to supply fuel-consuming systems.

12. A fuel-cell system as defined in claim 11, wherein the maximum extent of the volume of the variable fuel cavity is sufficient to ensure fuel supply for a heating-up phase of the fuel-cell system.

* * * * *